Aug. 5, 1952   M. J. FASANO ET AL   2,605,571
FISHING APPLIANCE
Filed June 29, 1946   2 SHEETS—SHEET 1
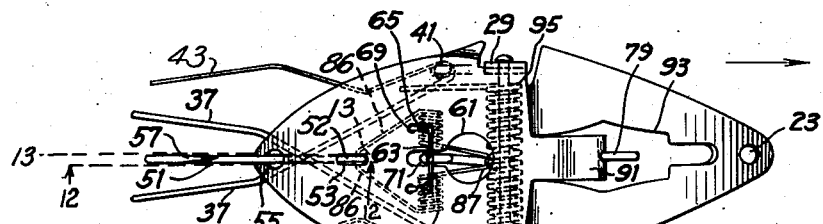
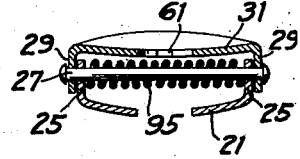
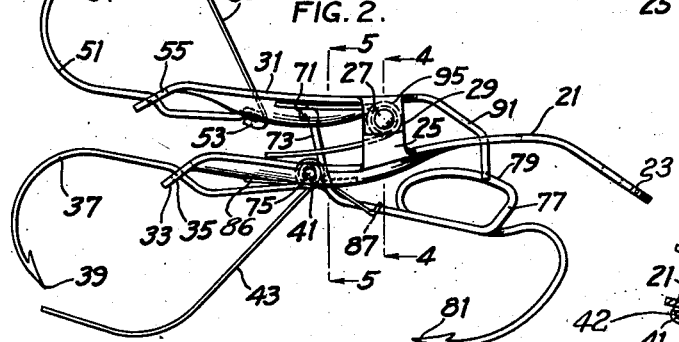
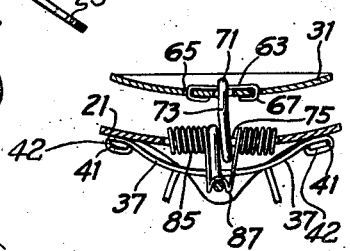
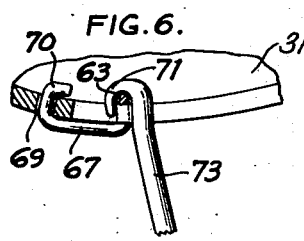
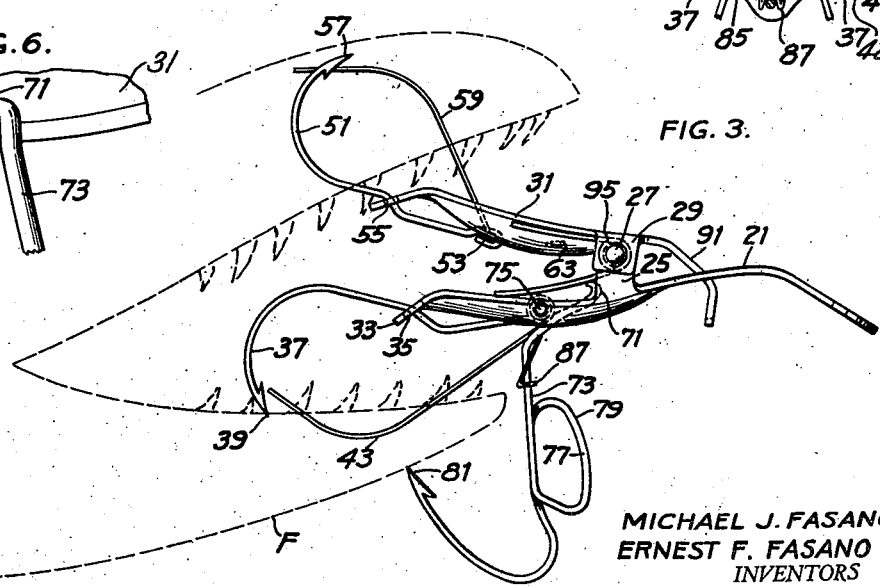
MICHAEL J. FASANO
ERNEST F. FASANO
INVENTORS
BY Charles Shepard
ATTORNEY

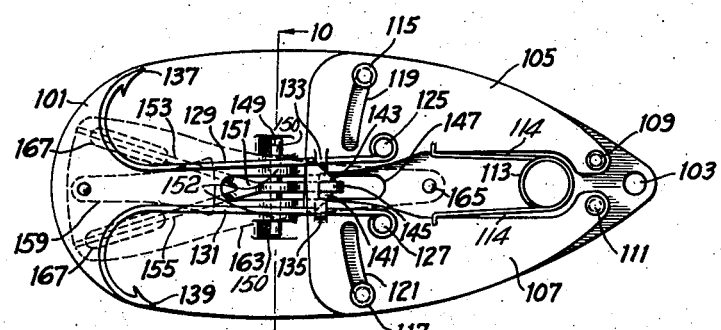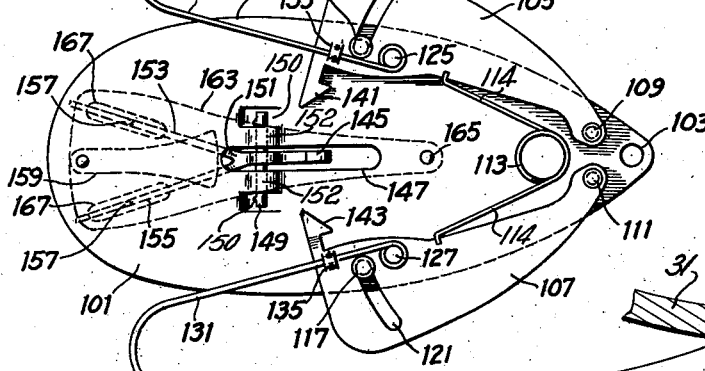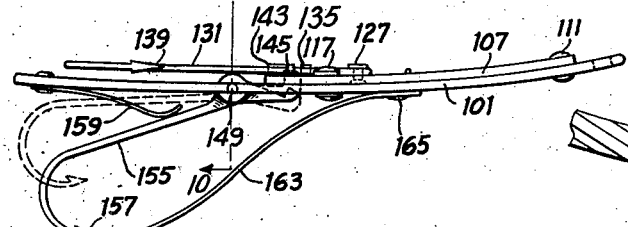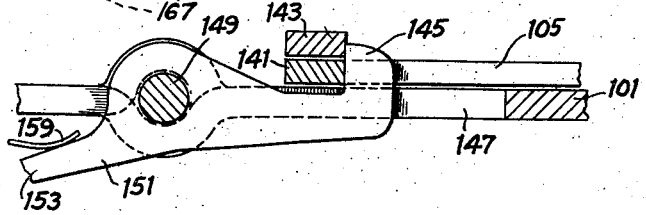
MICHAEL J. FASANO
ERNEST F. FASANO
INVENTORS
BY Charles Shepard
ATTORNEY Patented Aug. 5, 1952

2,605,571

UNITED STATES PATENT OFFICE 2,605,571

FISHING APPLIANCE

Michael J. Fasano and Ernest F. Fasano,
Rochester, N. Y.

Application June 29, 1946, Serial No. 680,458

9 Claims. (Cl. 43—36)

This invention relates to a fishing appliance, and more particularly an appliance in the nature of a hook mechanism for hooking and catching a fish.

An object of the invention is the provision of a generally improved and more satisfactory hook mechanism.

Another object is the provision of a fishing appliance having movable hooks which spring like a trap when a fish attempts to nibble the appliance, in order to engage the fish more firmly and securely.

Still another object is the provision of a fishing appliance having movable hooks for engaging the fish externally as well as hooks for engaging inside the mouth of the fish.

A further object is the provision of a fishing appliance having movable hooks which spring like a trap, and which is of such appearance as to be pleasing and attractive to the fish.

A still further object is the provision of a fishing appliance having movable hooks, so designed and constructed as to be easy and inexpensive to manufacture, not likely to get out of order, and easy to set when in use.

These and other desirable objects are accomplished by the construction disclosed as an illustrative embodiment of the invention in the following description and in the accompanying drawings forming a part hereof, in which:

Fig. 1 is a plan of a fishing appliance in accordance with one embodiment of the invention;

Fig. 2 is a side elevation thereof with the parts in set position;

Fig. 3 is a side elevation thereof with the parts in sprung or tripped position;

Fig. 4 is a section taken on the line 4—4 of Fig. 2, certain elements being omitted;

Fig. 5 is a section taken on the line 5—5 of Fig. 2, with parts broken away and parts omitted for the sake of greater clarity;

Fig. 6 is a view partly in section and partly in elevation illustrating details of the locking or holding mechanism;

Fig. 7 is a plan of a fishing appliance in accordance with a second embodiment of the invention, with the parts in set position;

Fig. 8 is a similar view with the parts in tripped or sprung position;

Fig. 9 is a side elevation of the construction shown in Fig. 7;

Fig. 10 is a section taken substantially on the line 10—10 of Fig. 7;

Fig. 11 is a view partly in section and partly in elevation of the holding or locking mechanism;

Fig. 12 is a view partly in section and partly in elevation illustrating details of the manner in which one of the fishhooks is attached to a plate;

Fig. 13 is a view partly in section and partly in elevation illustrating details of the manner in which one of the weed guards is attached to the plate.

The same reference numerals throughout the several views indicate the same parts.

In the first form of the invention, illustrated in Figs. 1 to 6, inclusive, and Figs. 12 and 13, the appliance includes a body structure comprising a main lower plate 21 and an upper plate 31, said lower plate having at its forward end a hole 23 to which a fishing line is attached, and having upturned ears 25 at its sides approximately midway of its length. A shaft 27 extending through these ears 25 connects them pivotally to the downturned ears 29 of a second or upper plate 31, approximately half the size of the main plate 21 and overlying the rear half of the main plate.

The rear edge of the main plate of the body is bent downwardly as indicated at 33 and is provided with an opening 35 through which extend the shanks of two hooks 37 curving rearwardly, downwardly, and then forwardly, as shown in Fig. 2, and terminating in sharp barbed ends 39 pointed forwardly. The hooks are anchored at their forward looped ends 41 by being engaged over downwardly and forwardly struck tongues 42 between slits formed in the plate 21, which tongues also anchor weed guards 43 for the same hooks. By anchoring the forward ends of the hooks and by passing the shanks of the hooks through the openings 35 as indicated, a particularly satisfactory and secure method of holding the hooks to the main plate 21 is provided.

One or more hooks 51 are similarly anchored to the upper plate 31, the forward end of the shank of the hook being formed into an eye 53 extending through and being crimped over the edges of a pair of small holes 52 in the plate through which the eye passes, and the shank of the hook then extending rearwardly through a hole 55 in the plate, the hook then bending upwardly and forwardly and terminating in a sharp barbed end 57 pointing forwardly as shown. A weed guard 59 associated with this hook is connected to the upper plate 31 in substantially the same manner as the forward end 53 of the shank of the hook.

In the upper plate 31 is a slot 61 of generally keyhole shape as indicated in Fig. 1, located a little rearwardly of the shaft 27. Across the narrow part of this slot 61 there extends a wire 63 which lies on the top surface of the plate 31, the wire being anchored to the plate by having its ends extending downwardly through the small holes 65 in the plate which are two or three times the diameter of the wire, thence rearwardly as indicated at 67, and upwardly again through other holes 69 which embrace the wire rather snugly as shown in Fig. 6, the ends of the wire being bent over the top of the plate as at 70, thus securely locking the wire 63 permanently to the plate, but allowing a limited amount of forward and backward play of the wire due to the natural resilience thereof. This wire, at the point where it extends across the narrow part of the keyhole slot, is adapted to be engaged by a hook 71 on an upstanding rod or arm 73 which is wrapped one or two turns around a shaft portion 75 formed integrally from the lower plate 21, to form a bearing thereon; the rod 73 thence extending obliquely downward (through a suitable opening in the plate 21) and forwardly, and having a large loop 77 to provide a curved cam surface 79 for use as explained later, and then extending further forwardly, downwardly, and rearwardly as indicated in Fig. 2 and terminating in a sharp barbed end 81 pointed rearwardly. A coil spring 85 coiled around the shaft 75 and having its ends 86 attached to the plate 21, has its midde portion forming a small loop extending across the top of the rod 73 as indicated at 87, this spring 85 constantly tending to turn the rod or arm 73 in a clockwise direction when viewed as in Fig. 2, about its shaft 75.

The cam portion 79 of the loop 77 cooperates with a resetting ear or flange 91 formed integrally with the top plate 31 and extending forwardly and downwardly through an opening 93 (Fig. 1) in the bottom plate 21 and constituting what may be termed a cam follower portion for actuation by the cam portion 79. A spring 95 coiled around the shaft 27 has its ends extending rearwardly from the shaft and pressing upwardly on the top plate 31 and downwardly on the bottom plate 21, constantly tending to turn the upper plate 31 in a clockwise direction and the lower plate 21 in a counterclockwise direction about the shaft 27 as viewed in Fig. 2. The hook 71 normally acts as a catch or latch, however, preventing such movement under the influence of the spring 95.

Various shapes may be given to the plates 21 and 31, as desired, to produce wobbling, rotation, spiral motion, or other desired type of motion as the device is drawn through the water.

Normally the parts are in the set position shown in Fig. 2, and are drawn through the water in a forward direction, that is from left to right when viewed as in Fig. 2. Bright colors or other markings on parts of the surfaces of the plates 21 and 31 may act to lure the fish. When the fish lunges for the appliance and closes his jaws on the same, the downward pressure on the upper rear hook 57 and the upward pressure on the lower rear hooks 39 moves the rear ends of the plates 21 and 31 slightly toward each other thereby acting as a trigger means, so that the wire 63 disengages from the hook 71 on the arm 73. The force of the spring 85, 87 then quickly swings the front hook 81 in a clockwise direction around its shaft 75, so that this hook comes around and impales the fish F under the chin, as indicated in Fig. 3, while at the same time the hooks 39 and 57 expand as soon as the pressure of the fish's jaws momentarily relaxes, and these hooks impale the fish in the roof of the mouth and in the inside of the jaw, as indicated in Fig. 3. Thus the fish is securely caught and even a fish of large size may be landed with a relatively small appliance of this character, because the fish is so securely impaled at different points. The fish cannot shake the appliance out of his mouth, and each time that he opens his jaws and releases pressure on the hooks 39 and 57, the spring 95 will keep these hooks tightly engaged inside his mouth.

In resetting the appliance for further use, it is simply necessary to grasp the forward end of the plate 21 in one hand, and grasp the shank of the hook 81 in the other hand and pull it forwardly. As the shank is pulled forwardly and upwardly toward the plate 21, the cam portion 79 on this shank will engage the under side of the depending forward end of the extension 91 on the top plate and will raise this extension 91, thus swinging the top plate in a counterclockwise direction around its pivot 27 against the force of the spring 95, the cam being so shaped that by the time the latch wire 63 on the upper plate is down in proper position to engage the hook 71, the hook is at the proper position to engage the wire. Due to the resiliency of the wire 63, the latch wire can spring rearwardly to pass behind the hook as the wire comes down, and then after passing the extreme end of the hook the wire 63 will spring forwardly a short distance, ready to engage in the loop of the hook when the resetting pressure is released.

In the second form of construction shown in Figs. 7–11, there is a main plate or body 101 of a three part lure having a hole 103 at its forward end for attachment to a fish line. Wing plates 105 and 107 are pivoted at 109 and 111, respectively, to the main plate or body structure 101 close to the forward end of the main plate, these wing plates lying on opposite sides of the center line of the main plate. A spring 113 has legs 114 engaging the edges of the wing plates 105 and 107 and constantly tends to separate these wing plates from each other. Headed studs 115 and 117, respectively, secured to the main plate 101, extend through arcuate slots 119 and 121, respectively, in the plates 105 and 107 and limit the outward swinging of these wing plates under the influence of the spring 113, while at the same time holding the wing plate against any substantial perpendicular movement away from the face of the main plate 101.

Riveted to the wing plates 105 and 107 at 125 and 127, respectively, are the forward ends of hooks 129 and 131, respectively, the shanks of which pass through slots 133 and 135, respectively, in the wing plates so as to anchor the hooks more firmly to the plates. These hooks extend rearwardly, then bend outwardly and forwardly and terminate in sharp barbed ends 137 and 139, respectively, which, when the wing plates are at their outward limits of motion as shown in Fig. 8, project a substantial distance laterally beyond the sides of the main plate 101. However, when the wing plates are in their innermost position as shown in Fig. 7, the ends of these hooks lie slightly inside of the outline of the main plate 101, and fairly close to the surface of the main plate, so that usually no weed guards are necessary for these hooks.

The two wing plates 105 and 107 are provided near their rear ends with hooks or latches 141 and 143, respectively, one being offset vertically with respect to the other so that one will overlie the other and they will not interfere with each other when the wing plates are in their innermost or set positions. When in their inner positions, these hooks are engaged by a latch member 145 projecting upwardly through a slot 147 in the main plate 101, and constituting the forward end of a combined fish hook and trigger member which is rotatably mounted on the shaft 149 mounted in slots formed in the plate 101, the metal on opposite sides of the slots being displaced or embossed in opposite directions as seen at 150 and 152 respectively in Fig. 10, so that the shaft 149 is held securely. Rearwardly of the shaft 149 the trigger member 151 is bifurcated or divided into two different shanks 153 and 155, each of which after extending rearwardly curves downwardly and then forwardly and terminates in a sharp barbed hook 157. A leaf spring 159 riveted at its rear end to the main plate 101 bears downwardly against the part of the latch member 145 which is rearwardly of the shaft 149 and constantly tends to hold this latch member in the position shown in Fig. 11. But if the hooks 157 be pressed upwardly relative to the plate 101 from the full line position shown in Fig. 9 to the dotted line position shown therein, this will move the latch 145 downwardly against the force of the spring 159, removing the latch from the hooks 141 and 143 on the wing plates 105 and 107 and allowing the spring 113 to move the plates laterally outwardly from the set position shown in Fig. 7 to the sprung or tripped position shown in Fig. 8, thus projecting the hooks 137 and 139 laterally outwardly beyond the outline of the base plate 101.

A weed guard 163 is provided for the hooks 157. This weed guard is in the form of a thin light plate having a narrow front end fastened to the base plate 101 at 165, and curving downwardly away from the base plate in a rearward direction and becoming wider so that at its rear end the plate 163 overlies both of the hooks 157 to form a guard for both of these hooks. The planes of the loops of these hooks are approximately perpendicular to the weed guard plate 163, and the weed guard plate is provided with slots 167 in line with the hooks and of sufficient size so the hooks may pass freely through the slots when the plate is flexed upwardly toward the bottom of the main plate 101. The narrow forward end of the weed guard plate 163, near its connection to the base plate 101, is quite flexible and so the pressure of a fish's jaws may easily flex the entire plate 163 upwardly, the trigger hooks passing through the slots. Then continued movement of the fish's jaws causes pressure on one or both of the trigger hooks 157, thus releasing the latch 145 from the latch hooks 141 and 143 so that the spring 113 throws the hooks 137 and 139 laterally outwardly, grabbing the fish inside the mouth near the gills. At the same time his mouth also becomes impaled on the trigger hooks 157. Thus he is securely caught. No matter how he tries to shake the hooks from his mouth, spring pressure constantly tends to expand the hooks 137 and 139 laterally, and to move the hooks 157 downwardly, so that the hooks are constantly pressed into the sides of his mouth and into his jaw regardless of opening or closing his mouth or shaking his head.

Bright contrasting colors or other attractive designs may be placed on the various parts of the appliance just described, including the weed guard plate 163, to aid in making the lure attractive to the fish.

It should be noted that, in both of the above described forms of construction, the springing or releasing of the appliance tends to force it rearwardly in a direction farther down the throat of the fish, thus increasing the reliability of the appliance. This rearward movement of the appliance when it trips is due partly to the effect of inertia and momentum of the parts under the influence of the sudden tripping or release of the spring forces, and partly to the reaction of the moving parts on the water in which they are immersed, especially in the form of construction first described, wherein the two plates 21 and 31, as they suddenly swing away from each other, react on the water to tend to cause rearward movement. The inertia effect tending to produce rearward movement results from the fact that when the latch of the plate 31 is tripped and this plate suddenly swings on its pivot 27, the center of gravity of the plate 31 will tend, through inertia, to remain stationary, and the pivot 27, being forwardly of the center of gravity, will tend to swing rearwardly relative to the center of gravity of the plate 31, thus producing a rearward component of force on the pivot 27 which is transmitted through this pivot to the main body plate 21. Similarly, in the second form of construction, the plates 105 and 107 will tend to swing about their centers of gravity, and this inertia tendency will produce rearward force components on their respective pivots 109 and 111 and on the main body plate 101. While these inertia forces are very slight, nevertheless they are in the right direction to tend or help to shove the appliance farther down the throat of the fish, rather than to pull it forwardly out of the fish's throat. It should also be noted that, in both forms of construction, the appliance trips or releases very easily under the bite of a fish, but is very unlikely to trip accidentally when hitting the water in casting. In both forms of construction a slight movement of the trigger parts (when hitting the water) may take place without tripping the appliance. In the first form of construction the hooks and weed guards will first hit the water and will tend to slow down the velocity of the appliance so that the plates 21 or 31 will not hit with sufficient force to cause tripping, yet the hooks themselves present such small area to the water that the water does not produce enough pressure on them to trip the device. In the second form of construction, a blow on what has been described as the top side of the appliance (if it falls onto the water upside down) will have no effect in tripping or releasing the appliance, while a blow on the under side( if it falls right side up) will be largely cushioned by the weed guard plate 163 which will protect the trigger hooks 157 from any sudden blow from the surface of the water.

In both forms of the invention, the bodies including main plates 21 or 101 may be made of moulded composition or plastic, or of metal, and may be mounted in any desired way.

In the foregoing descriptions reference has been made to the top, bottom, and sides of the appliances. It is to be understood that these words are used merely for convenience of description, for obviously at the instant a fish bites the appliance in the water, the appliance may be upside down or on its edge or at an oblique angle, with respect to the positions shown in the drawings.

In both forms of the appliance as herein disclosed, there is a body having at least three hooks secured to the body and mounted for pivotal movement relative to each other. In the first form of appliance, the body thereof includes the plate 21, having two hooks 37 mounted directly on the plate 21, and having a third hook 51 fixed to the other body member part 31 and thus secured to the plate 21 by the pivot 27 which connects the part 31 to the plate 21, and having a fourth hook 73, 77, and 81 secured to the plate 21 by the pivot 75. The third and fourth hooks are both movable relative to each other and relative to the hooks 37, so that there is clearly a relative movement between three hooks secured to the plate 21. In the second form of appliance, the main body is the plate 101, which has the two hooks 153 and 155 secured to the body 101 by the pivot 149. A third hook 129 is secured to the body 101 by the pivot 109, and a fourth hook 131 is secured to the body 101 by the pivot 111. Thus as before, there is relative movement between at least three hooks secured to the body 101.

It is seen from the foregoing disclosure that the above-mentioned objects of the invention are fulfilled. It is to be understood that the foregoing disclosure is given by way of illustrative example only, rather than by way of limitation, and that without departing from the invention, the details may be varied within the scope of the appended claims.

What is claimed is:

1. A fishing appliance including a body and at least three hooks secured to the body and mounted for pivotal movement relative to each other, spring means tending to move two of said hooks relative to each other, latch means for latching said two hooks against movement relative to each other, and trigger means operated by swinging movement of the third hook relative to one of said first two hooks for releasing said latch means so that said first two hooks may move relative to each other under the influence of said spring means.

2. A fishing appliance comprising a lure body including a plate, two hooks pivotally mounted on said plate for movement relative to each other and to said plate, spring means tending to move both of said hooks relative to each other and to said plate, latch means for holding said hooks against movement relative to said plate, and a third hook mounted on said plate and so connected to said latch means as to release said latch means in response to transverse pressure on said third hook, at least two of said hooks being mounted for swinging movement substantially in a common plane about pivotal axes substantially parallel to each other.

3. A construction as described in claim 2, in which said first two hooks are mounted for movement approximately in the directions of planes perpendicular to said plate, and in which said third hook is also mounted for movement approximately in the direction of a plane perpendicular to said plate.

4. A construction as described in claim 2, in which one of said first two hooks and said third hook are mounted for movement, when said latch means is released, in directions away from each other, and in which the other of said first two hooks is mounted for movement, when said latch means is released, in a direction toward said third hook.

5. A fishing appliance including two members mounted for movement relative to each other, spring means tending to separate said members from each other, a fish hook mounted on each of said members in position to impale the inside surface of a fish's mouth when said members move away from each other with said hooks inside a fish's mouth, an arm pivotally mounted on one of said members, said arm including a latch portion engaging the other of said members to hold said members against separation from each other, said arm also including a fish hook, and spring means tending to swing said arm to disengage the latch portion thereof from said other member and to swing the fish hook thereon into position to impale the exterior surface of a fish whose mouth is in position embracing said hooks on said members.

6. A construction as described in claim 5, further including a resetting cam portion on said arm and a cam follower portion on said other of said members so that when said arm is reset to initial position against the force of its spring means said cam portion will coact with said cam follower portion to reset said members relative to each other against the force of their spring means.

7. A fishing appliance including a member, a bifurcated lever pivotally mounted on said member, said lever having two arms in approximate side by side relation to each other, said arms having curved portions terminating in sharp points constituting fish-engaging hooks, a weed guard comprising a flexible plate secured to said member and normally overlying both of said sharp points and having slots in alinement with said sharp points so that when a fish bites said appliance the pressure of the fish's mouth will deflect said plate toward said member and said sharp points will pass through said slots to an exposed position to be engaged by said fish, another fish hook movably mounted on said member, spring means tending to move said other fish hook in a fish-impaling direction, and latch means operated by movement of said bifurcated lever for controlling movement of said other fish hook.

8. A fishing appliance including two members pivotally secured to each other, spring means tending to force said members apart, a fish hook mounted on each of said members, the first of said members having an opening, a flexible wire mounted on the first of said members and extending across said opening, and a latch member pivotally mounted on the second of said members and having a latch hook extending into said opening in the first of said members and hooked over said flexible wire to latch said members together and restrain them against movement under the influence of said spring means.

9. A fishing appliance including a body, a plurality of hooks mounted on said body for movement relative to each other, all of said hooks having a swinging movement about a relatively central region of said body, said plurality of hooks including two hooks normally close to each other in back-to-back relation to each other and having pointed ends faced away from each other, and a third hook having a pointed end normally spaced a substantial distance from the pointed ends of both of said first two hooks and faced toward the pointed end of one of said first two hooks, and spring means on the body including a latch tripped in response to a lateral deflection from normal position of one of said hooks for moving said first two of said hooks away from each other to impale the inner surface of a fish's mouth and for moving said third hook inwardly toward the others into contact with the exterior surface of the fish to impale the fish exteriorly of his mouth.

MICHAEL J. FASANO.
ERNEST F. FASANO.

REFERENCES CITED

The following references are of record in the file of this patent:

UNITED STATES PATENTS

| Number | Name | Date |
|---|---|---|
| 378,678 | Harlow | Feb. 28, 1888 |
| 597,142 | Eder | Jan. 11, 1898 |
| 973,119 | Lisch | Oct. 18, 1910 |
| 1,215,697 | Paulsen | Feb. 13, 1917 |
| 1,460,905 | Huntington | July 3, 1923 |
| 1,479,652 | Cranstone | Jan. 1, 1924 |
| 1,537,266 | Ryan | May 12, 1925 |
| 1,546,105 | Powell | July 14, 1925 |
| 2,134,841 | Reese | Nov. 1, 1938 |
| 2,406,912 | Schwarzer | Sept. 3, 1946 |